United States Patent [19]

Drecker et al.

[11] Patent Number: 5,943,385
[45] Date of Patent: Aug. 24, 1999

[54] NUCLEAR FUEL ASSEMBLY HAVING A TRANSITION PIECE PROVIDING A REDUCED FLOW RESISTANCE

[75] Inventors: Stefan Drecker, Herzogenaurach; Dieter Menges, Eggolsheim; Werner Meier, Kunreuth; Dietrich Alter, Erlangen; David Barkhurst, Pasco; Knut Emmert, Frankfurt, all of Germany

[73] Assignee: Siemens Aktiengesellschaft, Munich, Germany

[21] Appl. No.: 09/128,391

[22] Filed: Aug. 3, 1998

Related U.S. Application Data

[63] Continuation of application No. PCT/US96/01275, Feb. 2, 1996.

[51] Int. Cl.[6] .............................. G21C 3/322; G21C 5/06
[52] U.S. Cl. ........................ 376/352; 376/443; 376/451
[58] Field of Search .................................. 376/352, 362, 376/364, 443, 444, 451

[56] References Cited

U.S. PATENT DOCUMENTS

| | | | |
|---|---|---|---|
| 3,389,056 | 6/1968 | Frisch | 376/352 |
| 4,826,653 | 5/1989 | Nylund et al. | 376/352 |
| 5,483,565 | 1/1996 | Gronlund et al. | 376/352 |
| 5,727,040 | 3/1998 | Lippert et al. | 376/352 |

FOREIGN PATENT DOCUMENTS

| | | |
|---|---|---|
| 0 027 984 | 5/1981 | European Pat. Off. . |
| 44 18 500 | 12/1994 | Germany . |
| 43 27 001 | 2/1995 | Germany . |
| 470 728 | 3/1969 | Switzerland . |

*Primary Examiner*—Daniel D. Wasil
*Attorney, Agent, or Firm*—Herbert L. Lerner; Laurence A. Greenberg

[57] ABSTRACT

In order to reduce the flow resistance of a coolant flowing through a passage in a support plate of a boiling water reactor and entering a transition piece at a lower end of a fuel assembly resting on the support plate, a lower rim of the transition piece forms a conically tapered surface which fits into a corresponding conical counter-surface at an upper edge of the passage. The lower rim of the transition piece forms a circular inlet which is concentric with the passage and has a size equal to or slightly larger than the passage. Fingers protruding laterally into the passage and extending down into the passage are used to center the lower rim within the passage. Additionally, end caps of the fuel rods may be stream-lined and the lower tie plate of the fuel assembly may be spaced apart from an inner surface of a fuel channel by a plurality of ribs which form a plurality of peripheral through holes on each of the four inner surfaces of the rectangular-shaped fuel channel.

11 Claims, 8 Drawing Sheets

NUCLEAR FUEL ASSEMBLY HAVING A TRANSITION PIECE PROVIDING A REDUCED FLOW RESISTANCE

CROSS-REFERENCE TO RELATED APPLICATION

This is a continuation of copending International Application PCT/US96/01275, filed on Feb. 2, 1996, which designated the United States.

BACKGROUND OF THE INVENTION

FIELD OF THE INVENTION

The invention relates to a nuclear fuel assembly for a nuclear boiling water reactor and especially to a fuel assembly for the reactor having a transition piece providing a reduced flow resistance.

The core of a boiling water nuclear reactor normally has a core support plate or an equivalent core structure on which the nuclear fuel assemblies rest. Cylindrical passages extend practically perpendicularly through the support plate and lead a moderator coolant flow through the support plate and into the fuel assemblies. The configuration of the fuel assemblies, particularly the transition piece, effects the flow resistance of the coolant.

SUMMARY OF THE INVENTION

It is accordingly an object of the invention to provide a nuclear fuel assembly having a transition piece providing a reduced flow resistance which overcomes the above-mentioned disadvantages of the prior art devices of this general type, and which has an extremely low flow resistance in the region of the transition piece.

With the foregoing and other objects in view there is provided, in accordance with the invention, in combination with a core of a boiling water nuclear fuel reactor, including a support plate and cylindrical coolant flow passages each having a cylindrical part and a conical upper rim acting as a counter surface and extending substantially perpendicularly through the support plate, a nuclear fuel assembly resting on the support plate and subjected to the coolant flow, including: a) a fuel channel has open upper and lower ends and an essentially rectangular cross section; b) a bundle of substantially vertical fuel rods intersect the cross section of the fuel channel, the fuel rods are laterally surrounded by the fuel channel; and c) a transition piece inserted into the open lower end of the fuel channel and having an essentially circular inlet opening formed therein, including: i) an annular rim surrounds the essentially circular inlet opening at a lower end of the transition piece, the annular rim has a conically tapered sealing surface to be fitted into the corresponding conical counter-surface formed by the upper rim of one of the cylindrical passages; ii) a lower tie plate disposed in the lower open end of the fuel channel; iii) a funnel-like enlargement piece adjacent the conically tapered sealing surface and having an upper part, the upper part of the funnel-like enlargement piece matches the cross section of the fuel channel and supports the lower tie plate covering the open lower end of the fuel channel; and iv) a centering and positioning device for positioning the conically tapered sealing surface in a coaxial position with respect to the conical counter surface, the centering and positioning device protrudes from the annular rim down into one of the cylindrical passages, the positioning and centering device has at least three fingers equidistantly distributed along a circumference of the annular rim, and the circular inlet opening has a diameter equal to a diameter of one of the cylindrical passages, and the at least three fingers extend radially into the circular inlet opening.

According to an object of the invention, the fuel assembly of the above mentioned kind is provided to fit into the passage of the support plate and has an enlarged inlet opening at the lower end of the transition piece.

It is a further object to provide a fuel assembly that can be easily inserted and exactly positioned in the passage opening of the support plate.

Other objects are directed to a low flow resistance of the fuel assembly, in the region of the assembly where the lower tie plate and the lower ends of the fuel rods are positioned.

It is also an object to improve the construction of the lower part of the fuel assembly with respect to the rate of coolant flow within the assembly, especially for a mixed core where assemblies of different constructions are present.

Those objects are achieved by an improved transition piece wherein the centering and positioning device at the lower rim of the transition piece consists of at least three fingers. The three fingers are equidistantly distributed along the circumference of the annular rim. The inlet opening of the transition piece (i.e. the interior cross section of the annular rim) has essentially the same diameter as the cylindrical passage. The fingers extend radially into the circular inlet opening and axially down into the cylindrical part of the passage which is formed by the core support plate.

In accordance with an added feature of the invention, the at least three fingers have straight finger parts adjacent the annular rim and parallel to side walls of the cylindrical passages.

In accordance with another feature of the invention, the straight finger parts have a peripheral surface forming segments of a surface of a cylinder with a radius, the radius of the cylinder is at most one millimeter less than a radius of the cylindrical passages.

In accordance with an additional feature of the invention, the conically tapered sealing surface has, at its smallest circular cross section, a diameter at least equal to a diameter of the cylindrical passages.

In accordance with a further added feature of the invention, the conical counter-surface and the cylindrical part of the cylindrical passages form an edge surrounding an axis of the cylindrical passages, and the annular rim of the transition piece is configured to be positioned above the edge.

In accordance with a further additional feature of the invention, there is a lower most tip part, the at least three fingers have finger ends pointing to each other in a star-like manner and are fixed together by the lower most tip part.

In accordance with another added feature of the invention, there are connecting pieces having one of a concave curvature and a recessed edge with respect to a slope of the conically tapered sealing surface, the at least three fingers are connected to the annular rim by the connecting pieces.

In accordance with yet another additional feature of the invention, the fuel channel has four side walls, the lower tie plate has a smaller cross section than the fuel channel, and includes a plurality of ribs, the lower tie plate is spaced apart from the walls of the fuel channel by the plurality of ribs on each of the four side walls of the fuel channel, the plurality of ribs forms a plurality of flowthrough holes between the fuel channel and the lower tie plate.

In accordance with yet another feature of the invention, the plurality of ribs have a base with a width at most equal to about half a distance between adjacent ribs.

In accordance with yet another additional feature of the invention, each of at least a majority of the fuel rods has an end cap at a lower end of the fuel rods, and the fuel rods are positioned above the lower tie plate.

In accordance with a concomitant feature of the invention, the end cap has a profile to be grasped by a handling tool, and one of a streamlined and approximately half-spherically rounded tip below the profile and a rounded edge above the profile.

Other features which are considered as characteristic for the invention are set forth in the appended claims.

Although the invention is illustrated and described herein as embodied in a nuclear fuel assembly having a transition piece providing a reduced flow resistance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
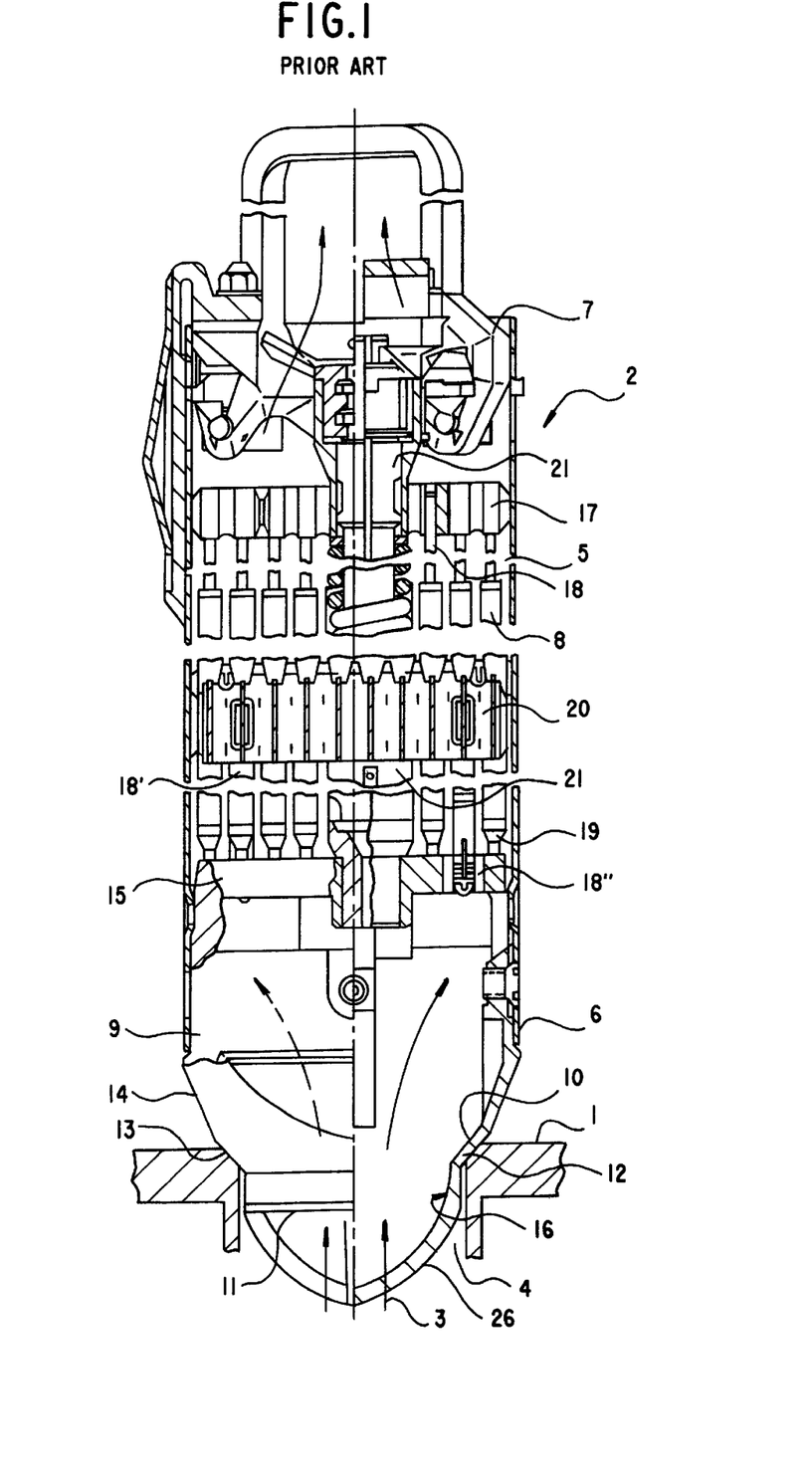
FIGS. 1 and 2 are longitudinal-sectional views of prior art fuel assemblies and their transition pieces.

Referring now to the figures of the drawing in detail and first, particularly, to FIG. 1 thereof, there is shown a typical prior art fuel assembly 2 according to Published, Non-Prosecuted, German Application No. 43 27 001 A1, which rests on a support plate 1 of a nuclear boiling water reactor. A moderating coolant flow (arrow 3) flows through one of many cylindrical passages 4 of the support plate 1 and enters the fuel assembly 2. The fuel assembly 2 contains a fuel channel 5 that has an open lower end 6, an open upper end 7 and a practically rectangular cross section. The fuel assembly 2 further contains a bundle of fuel rods 8 and a transition piece 9. The fuel rods 8 intersect the cross section of the fuel channel 5 in a practically vertical direction and are laterally surrounded by the fuel channel 5. The transition piece 9 is placed in the open lower end of the fuel channel 5 and contains an annular rim 10 at its lower end, a funnel-like enlargement 14 adjacent to the annular rim 10 and a centering and positioning device 16 which protrudes from the annular rim 10 down into one of the cylindrical passages 4.

The annular rim 10 surrounds an inlet opening 11 at the lower end of the transition piece 9 and forms a sealing surface 12 which is conically tapered fit into a corresponding conical counter-surface at an upper rim 13 of the passage 4. Therefore, the coolant flow is sealed against the outside of the fuel channel 5 when it leaves the passage 4.

The funnel-like enlargement 14 acts as an adapter between the smaller inlet opening 11 which is in line with the passage 4, and the larger cross section of the open lower end 6 of the fuel channel 5. Adjacent to the conically tapered sealing surface 12, the enlargement 14 reaches to an upper part, which matches the angular cross section of the fuel channel 5 and bears a lower tie plate 15 covering the open lower end of the fuel channel 5.

The centering and positioning device 16 positions the tapered sealing surface 12 in a coaxial position with respect to the conical counter-surface at the upper rim 13 of the passage 4.

It is further mentioned that in this case some of the fuel rods 8 do not completely extend up to an upper tie plate 17. However, the majority of the fuel rods 8 do extend up into the upper tie plate 17 and have upper ends 18 guided in openings of the upper tie plate 17. The shorter fuel rods 18' ("part-length fuel rods") are screwed into the lower tie plate 15 (see screw connection 18"), while the other fuel rods 8 have lower end caps 19 which are not fixed to the lower tie plate 15, but end at or above the lower tie plate 15. The lower end caps 19 of the fuel rods have a cylindrical lower tip including a notch where they can be grasped by a handling tool in order to pull them through meshes of spacer grids 20 during assembly of the fuel assembly 2. The spacer grids 20 hold the fuel rods 8 in position and are supported by a water rod 21 which acts as the "backbone" of the fuel assembly skeleton and bears the upper and lower tie plate 17, 15.

Special notice is given to the centering and positioning device 16 since this element will be altered according to the invention. The centering and positioning device 16 is formed of a cylindrical element that fits into the cylindrical part of the passage 4. Accordingly, the effective cross section available for the coolant flow 3 in the passage 4 is reduced to the smaller inner cross section of the cylindrical piece of tubing.

In order to position the fuel assembly 2 on the support plate 1, the fuel assembly 2 is lowered and four fingers 26 which form a star-like crown on the lowermost end of the fuel assembly 2 lead the transition piece 9 into the passage 4.

Figure 2:
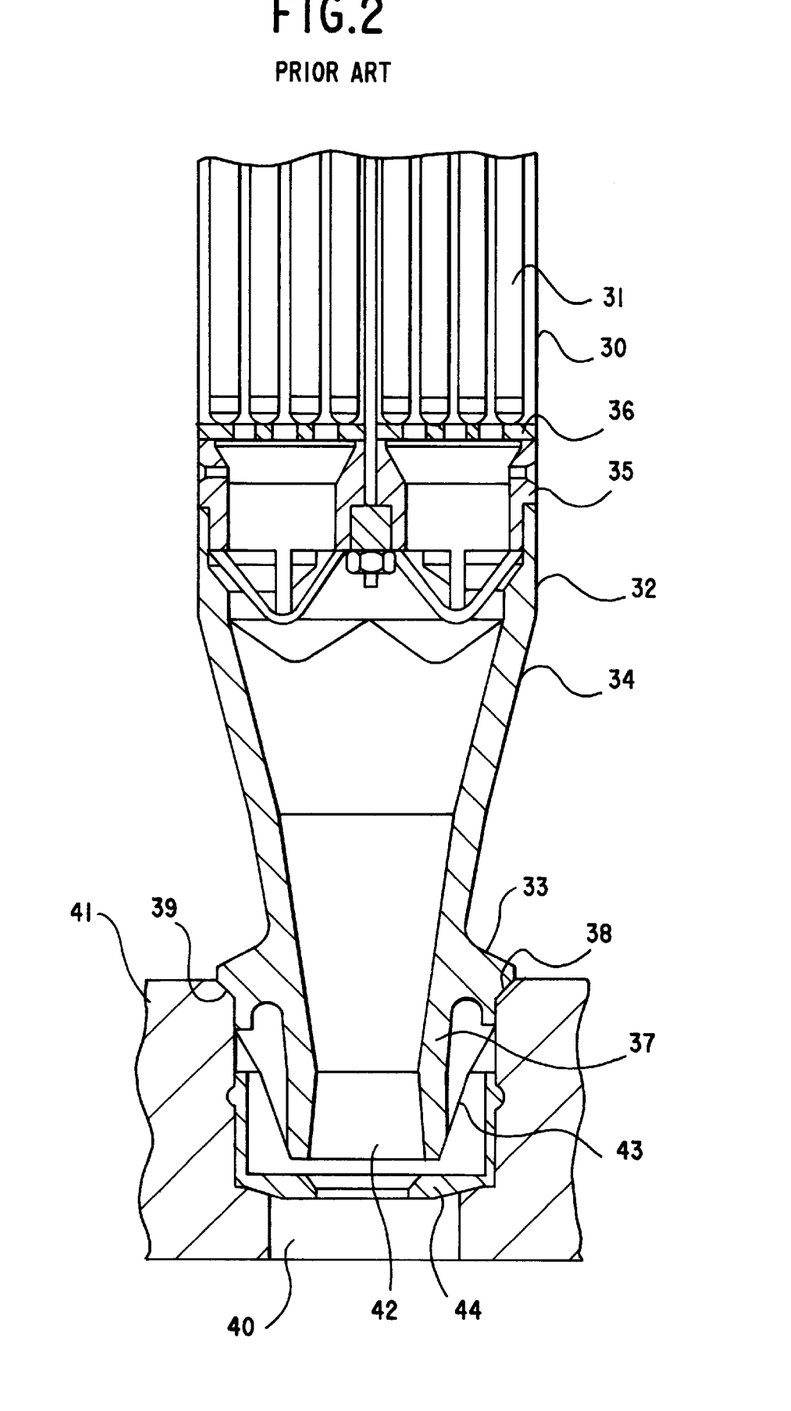

In FIG. 2 a similar construction according to European Patent Application 0 027 984 A2 is shown and has essentially the same elements, including: a fuel channel 30, a bundle of fuel rods 31 and a transition piece 32 having an annular rim 33, a funnel-like enlargement 34 (including an upper part 35 with a lower tie plate 36) and a centering and positioning device 37. The annular rim 33 has a conically tapered sealing surface 38 which forms a sealing connection together with a corresponding counter-surface at an upper rim 39 of a cylindrical passage 40 which extends through a core support plate 41. The centering and positioning device 37 is again a cylindrical element 37 which extents down into the cylindrical passage 40.

In this case, the cylindrical element 37 and the funnel-like enlargement 34 have the shape of a Venturi in order to reduce the pressure drop of the coolant flow when passing through the passage 40 and an inlet opening 42. There are no star-like fingers crossing the inlet opening 42, but the cylindrical element 37 is stiffened by lateral ribs 43 in order to protect the Venturi during the insertion of the fuel assembly into the passage 40.

The nuclear heat produced within each specific fuel assembly requires a sufficient coolant flow to be provided in the assembly, i.e. the coolant flow through the support plate must be distributed over the cross sectional area of the core in such a way that each fuel assembly gets its specific part of the total coolant flow. The distribution is accomplished in FIG. 2 by a throttling plate 44 inserted in the inlet opening 42 and individually adapted to the requirements of the corresponding fuel assembly. At the end of each operating cycle of the nuclear reactor, some of the fuel assemblies are burned out and must be replaced with fresh fuel assemblies having fresh nuclear material. According to advanced developments the fresh fuel assemblies may have an advanced structure with an altered flow resistance. This results in a "mixed core" where the fresh fuel assemblies stand next to the old assemblies, and the fresh and the old assemblies vary in their flow resistance. But minor differences in flow resistance are tolerable in order to guarantee efficient coolant flow within each fuel assembly. On the other hand, advanced fuel assemblies may have a higher reactivity and require a higher coolant flow, therefore the flow resistance of the fresh assemblies should be slightly less than the resistance of the older assemblies to redistribute the flow in favor of the new assemblies.

Additionally, the coolant flow in the boiling water reactor assembly can become unstable if the flow resistance in the lower part of the assembly is not high enough with respect to the coolant flow in the upper part of the assembly. The coolant entering the lower part of the assembly is liquid water, but it leaves the upper end of the assembly as a mixture of water and steam. Due to the increase in specific volume, the flow velocity is remarkably increased in the upper parts of the fuel element. Stable flow conditions require that the resistance of the assembly be thoroughly adjusted in different parts of the assembly.

In FIG. 2, selecting a suitable throttling plate 44 allows the adaptation of the flow resistance at the entrance of the fuel assembly to the specific requirements, as long as the minimum flow resistance (throttling plate 44 omitted) is less than the required value. Otherwise the passage opening in the core plate itself has to be enlarged. But changing the core support plate, an essential part of the reactor itself, is not an alternative. In other words, the peripheral dimensions of the fuel assemblies (including the lower rim of the transition piece and its sealing surface that fits into the profile of the passages of the core plate) are fixed.

The interior of the fuel assembly however is open to modifications. For instance, the number of fuel rods may vary from 6×6 to 10×10, where the higher numbers are preferred. The same nuclear material if distributed in a higher number of fuel rods, leads to a lower specific heat production of the individual fuel rod, thereby decreasing the thermal load of each fuel rod and the highly temperature-dependent corrosion of the cladding material. On the other hand, the fuel rods are regularly distributed over the cross section of the fuel channel, and the higher number of fuel rods result in an increase of flow resistance.

In order to guarantee the required fuel moderator ratio even in the steam region of the fuel assembly, a water rod or a similar water channel structure (for instance a cross-like channel which divides the rectangular fuel channel into four sections) is often used to guide non-boiling water into the upper region of the fuel assembly. It is also known that the use of some part-length fuel rods has the advantage that the flow resistance in the steam region decreases by increasing the flow cross section while the proper fuel moderator ratio is maintained in the upper part of the assembly. Consequently, the flow resistance in the lower part should be reduced.

It was also found that the coolant flow inside the fuel channel depends on the sealing quality between the lower rim of the transition piece and the side wall or upper rim of the passage in the support plate. Sometimes the sealing surfaces of the rim and/or the passage are damaged due to the impact of the transition piece on the support plate during installation. Any deformation of the sealing surfaces is not only harmful to the sealing quality of the fitting, but also to the exact position of the fuel assembly in the reactor core where fuel assemblies stay very close together and must be held in their correct, upstanding position as exactly as possible.

The transition piece, including the lower tie plate, is often cast in one piece and has a rather complex geometrical structure. In the embodiment described in FIGS. 3 to 8 as an example of the invention, the lower tie plate is a separate part held by a supporting skeleton (e.g. the above mentioned central water rod) for the fuel rod bundle. In other embodiments specifically configured supporting rods form the skeleton. In many cases it is convenient to cast the transition piece and the lower tie plate separately and then weld them together afterwards. In any case, some surface dimensions and outer faces of the transition piece (mainly the above-mentioned sealing surface and the guide device) are essential and may be worked in by mill smoothing or polishing at the end of the manufacturing process.

Figure 3:
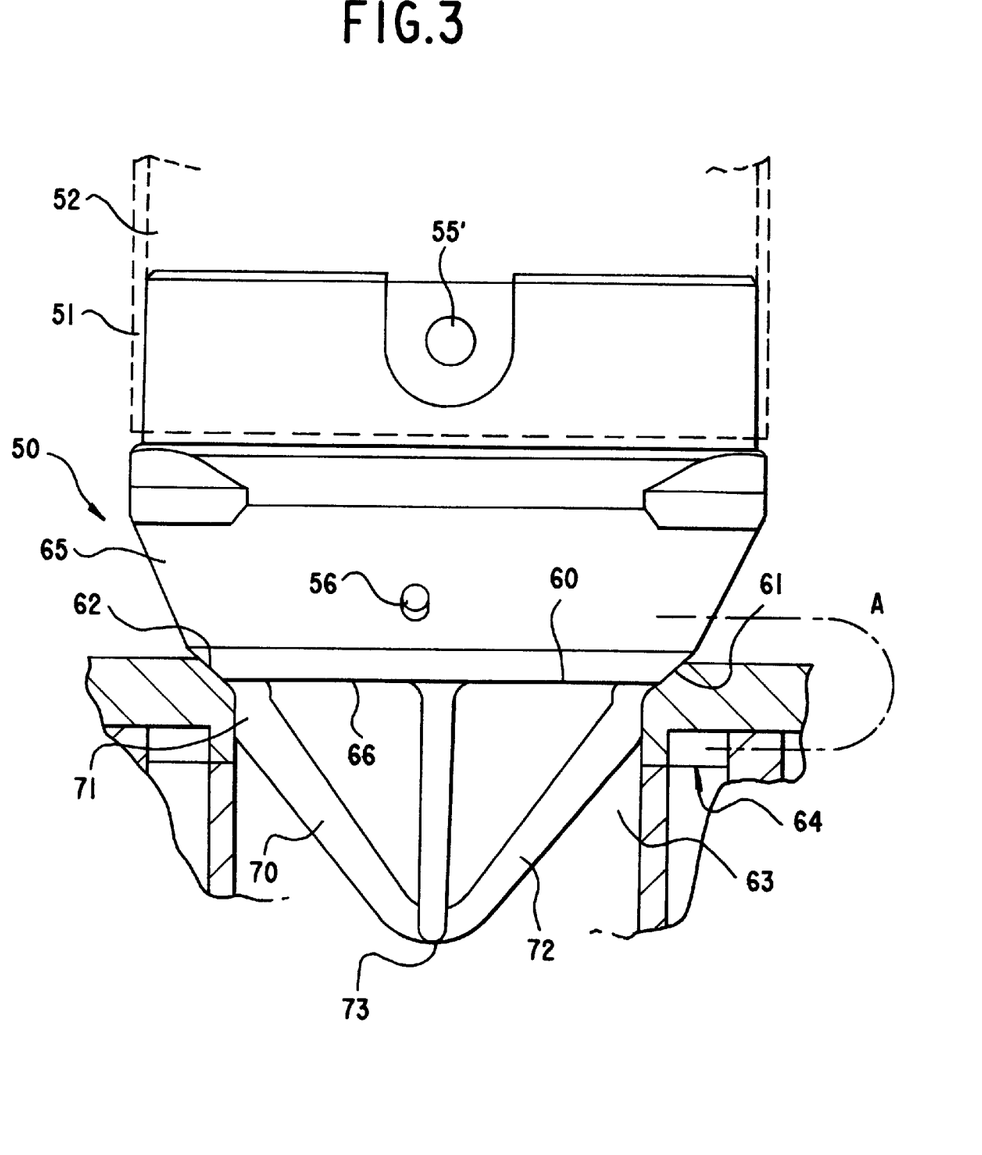
FIG. 3 is a side-elevational view of a transition piece according to the invention.
Figure 4:
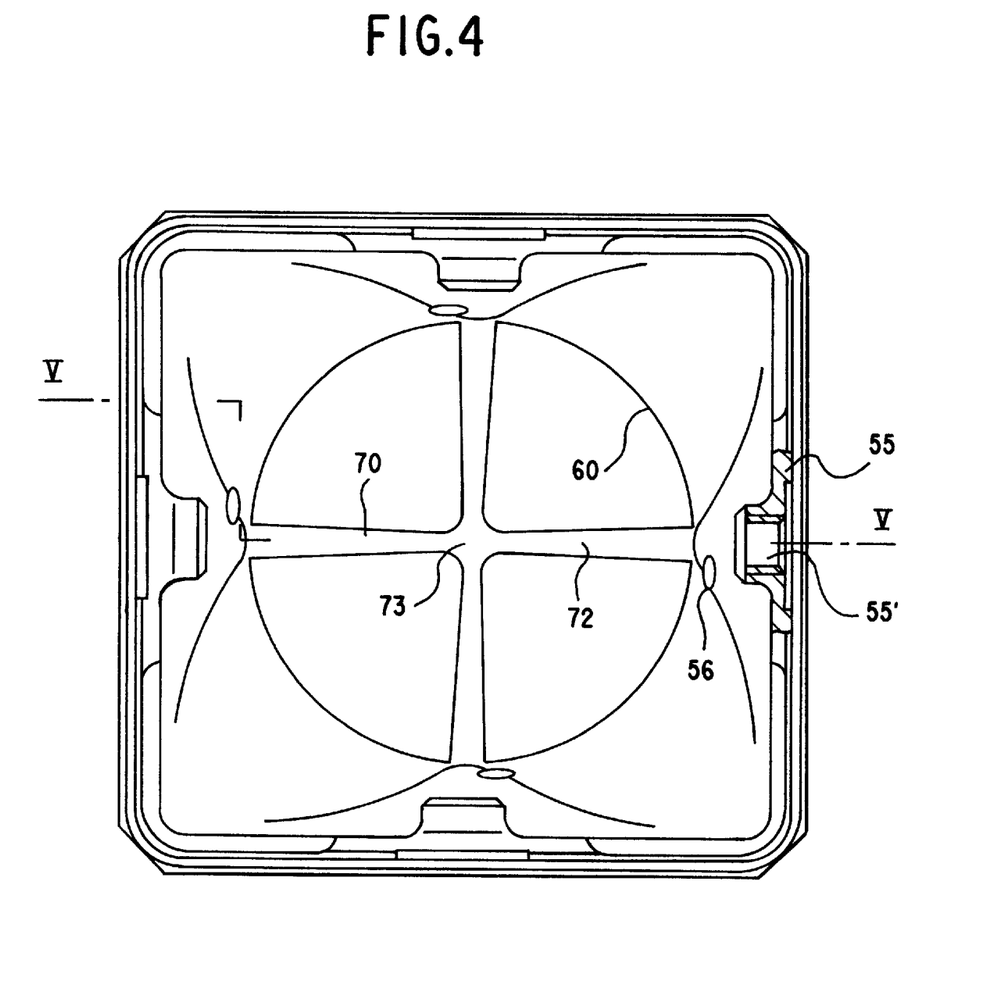
FIG. 4 is a plan view of the transition piece.
Figure 5:
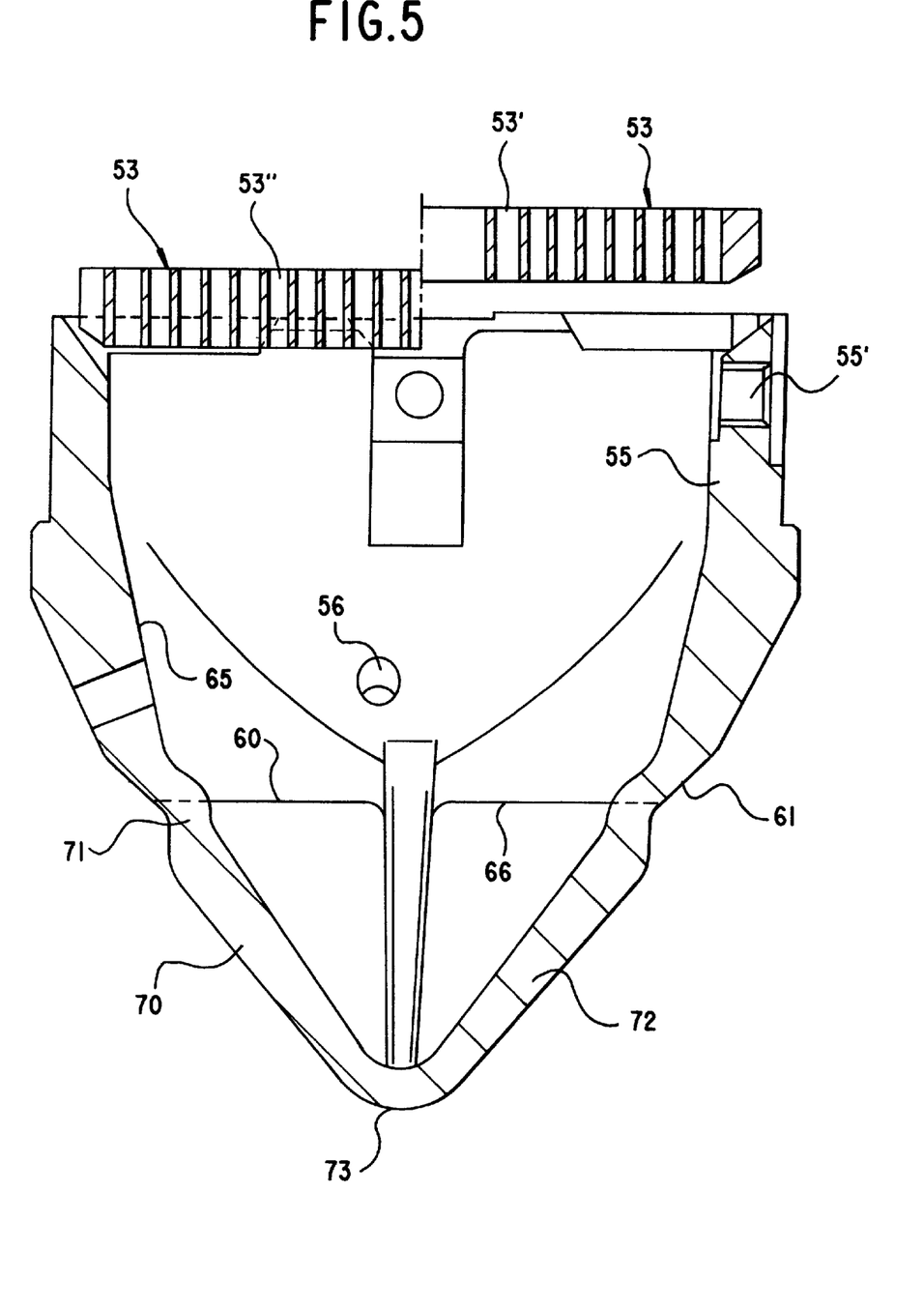
FIG. 5 is a longitudinal-section view along plane V—V of FIG. 4 of a lower tie plate in its final position.

With reference to FIGS. 3 to 5, a transition piece 50 has an upper part 51 which fits into an open lower end of a fuel channel 52. The fuel channel 52 is shown only by dashed lines in FIG. 3. In FIG. 5 a lower tie plate 53 with internal through holes 53' and peripheral through holes 53" rests on the upper part 51 of the transition piece 50.

The interior of the upper part 51 has stiffening ribs 55 with openings 55' in which a screw may be threaded in order to fix the fuel channel 52 to the transition piece 50. The screw is used to create a sealing fitting or at least a very well defined gap between the walls of the fuel channel 52 and the transition piece 50 in order to limit the amount of coolant which may escape from the interior of the fuel assembly. But since a defined amount of coolant flow is needed outside of the fuel channel 52, the transition piece 50 has lateral bypass openings 56.

An annular lower rim 60 has a conical shape on its outer sealing surface 61 and rests on a corresponding conical rim 62 (FIG. 3) which forms the outlet of a cylindrical passage 63 in a support plate 64.

According to this construction, the lower end of the fuel assembly is inserted into the passage 63, the conical rim 62 of the passage 63 is a counter-surface 62 corresponding to the conical sealing surface 61 of the lower rim 60. The two surfaces fit together and form a seal that prevents any coolant passing through the passage 63 from escaping in an uncontrolled manner. Between the outer sealing surface 61 and the lower end of the fuel channel 52, the transition piece 50 enlarges in a funnel-like manner. An enlargement 65 transforms the cross section available for the coolant flow, from a smaller circular inlet opening 66 at the lower rim 60 to the larger quadratic (or at least polygonal) open end of the fuel channel 52.

The inlet opening 66 is surrounded by the annular lower rim 60. A diameter d of the inlet opening 66 is defined by the diameter in a plane where the conical sealing surface 61 shows its most narrow part, as can be seen from FIG. 6. If the diameter d is smaller than a diameter D1, which is defined by the cross section of the cylindrical part of the passage 63, the rim 62 of the support plate 64 will extend through a plane B—B where the cylindrical part of the inlet opening 66 transforms into the conical rim (counter-surface) 62 and forms an edge. If the diameter d is larger than a diameter D2 of the conical rim (counter-surface) 62 at the plane of its largest cross section, the annular lower rim 60 would just rest on the upper plane surface of the support plate 64 and no seal would occur between the outer sealing surface 61 and the conical rim (counter-surface) 62.

Figure 6:
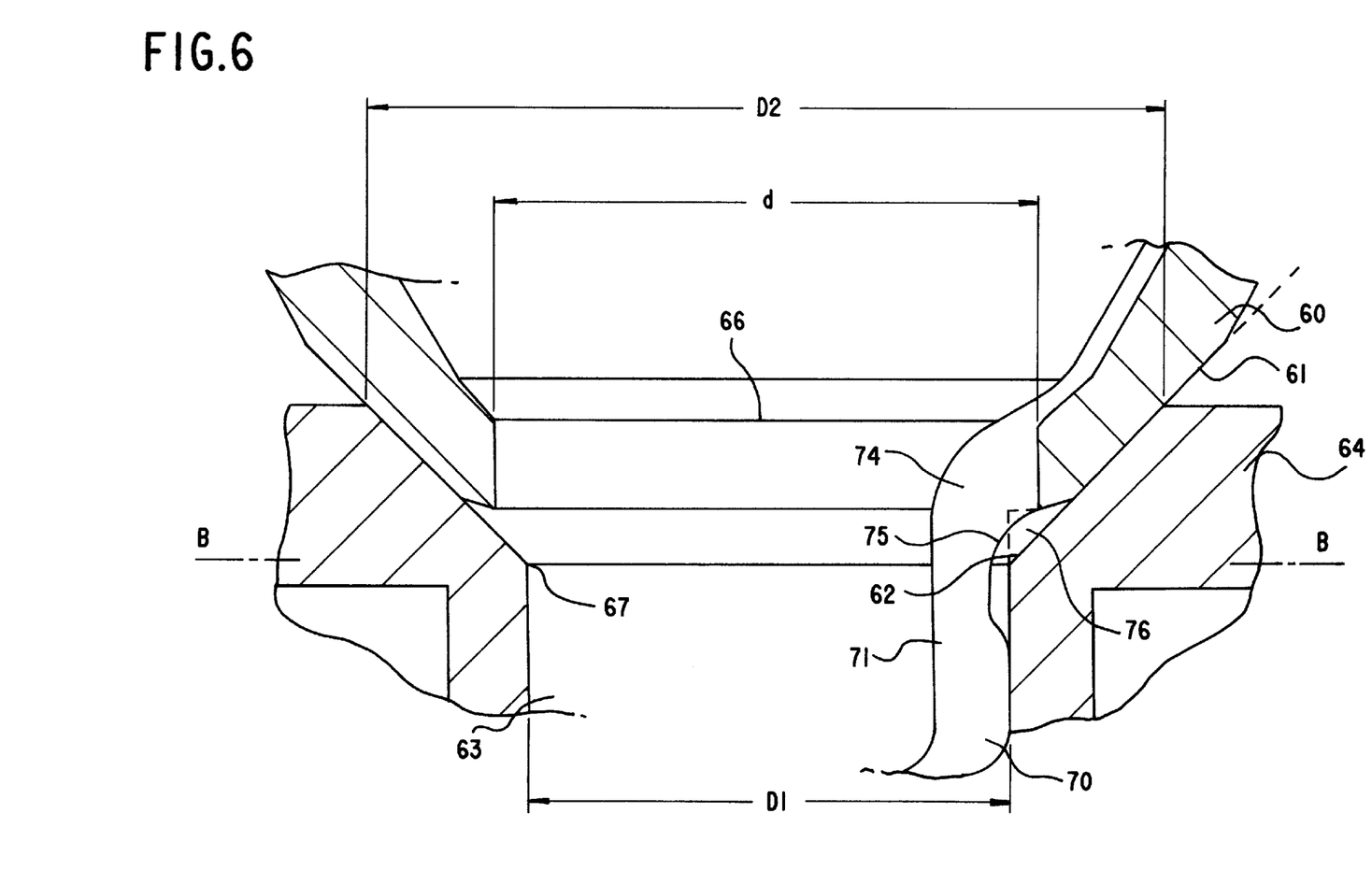
FIG. 6 is an enlarged, fragmentary longitudinal-section view of FIG. 3 showing a fuel assembly resting on a core support structure.

In order to provide a large inlet opening for the coolant flow, the diameter d is approximately equal to D1 and preferably slightly larger (i.e. d lies between D1 and D2, advantageously nearer to D1 than D2). In this manner, the annular lower rim 60, 61 lies completely above an edge 67, but not on the upper plane of the support plate 64.

In order to ease the insertion of the annular lower rim 60 into the passage 63 as well as to center the transition piece 50 of the fuel assembly in its correct position, a corresponding device protrudes downwards from the annular lower rim 60 into the passage 63. In the prior art (FIGS. 1 and 2) this centering and positioning device is a small cylindrical element, the periphery of which is fitting as close as possible into the cylindrical part of the passage. The prior construction is connected with an unfavorable small cross section of the inlet opening. Therefore, according to the invention of the instant application, only several fingers 70 (at least three, preferably four) act as such a centering and positioning device 70.

The fingers 70 are equidistantly distributed along the circumference of the annular lower rim 60. They are attached to the inner surface of the annular lower rim 60 pointing towards the axis of the fuel assembly, and have straight parts 71, adjacent to the annular lower rim 60 and practically parallel to the cylindrical side walls of the passage 63. Therefore, the straight finger parts 70, 71 position the transition piece 50 in a position where the inlet opening 66 and the passage 63 are practically concentric. The peripheral surface of the finger parts 70 (i.e. the surface pointing towards the side walls of the passage 63) form segments of the surface of a cylinder. The radius of the cylinder being nearly the same as the radius D1 of the passage 63 (for instance at most 1 mm less if possible according to the tolerance limits of D1).

FIG. 3 further shows that the fingers 70 have finger ends 72 that point to each other in a star-like manner. They may be fixed together at a knot point 73 that forms the lowermost tip part of the transition piece 50. In other embodiments, the knot point 73 could be replaced by a ring that connects the finger ends 72 together.

Detail A of FIG. 3 shows a preferable shape of the straight finger parts 71 connected to the annular lower rim 60, and is shown in more detail in FIG. 6. As shown, the conical sealing surface 61 and the conical rim (counter-surface) 62 are in close contact with each other and form the above mentioned seal. The straight finger parts 71 virtually contact the side walls of the cylindrical part of the passage 63. A connecting piece 74 connecting the straight finger parts 71 to the annular lower rim 60 leaves a gap 76 between the edge 67 and the end of the transition piece 50. Therefore, the edge 67 can not damage the conical sealing surface 61 nor the straight finger parts 71.

The gap 76 is created by a concave curvature 75 of the connecting piece 74 or at least by a recessed edge (dashed line in FIG. 6), with respect to the slope of the conical sealing surface 61.

This construction reduces the danger of damaging (scratching or deforming) the conical sealing surface 61 and its counter-surface on the conical rim 62.

The pressure drop across the transition piece 50 is considerably less than in the case of the prior art device shown in FIG. 1. With respect to the straight finger parts 71 of FIG. 3 and compared to the element 16 which is shown in FIG. 1 extending down into the passage 4, it is noted that only the straight fingers 70, 71 are left extending into the passage 63. Therefore, about 90% of the cross section area of the cylindrical element is gained in order to increase the inlet opening of the transition piece 50. This leads to a decreased pressure drop, which is even further decreased by a better hydrodynamic flow pattern, which is essentially the pattern of a Venturi nozzle.

The corresponding reduction in pressure drop may be used for balancing an additional pressure drop that is created if additional elements of construction are desired within the fuel assembly. Since broken parts and other debris which are carried by the coolant flow may damage the fuel rods, a debris filter should be placed in the coolant flow path before the coolant reaches the fuel rods. If cooler and warmer parts of the coolant flow are mixed, a more efficient cooling takes place and it is advantageous to attach mixing vanes to the spacer grids or use additional mixing grids. These and other improvements create the need for an additional compensation by modifications that decrease the pressure drop in other parts of the fuel assembly.

If in a nuclear reactor using its specific coolant flow rate and velocity, the throttling plate 44 in the core support plate 41 of FIG. 2 is removed to decrease the pressure drop, the configuration of the transition piece 32 (FIG. 2) creates, due to its Venturi-pattern, a pressure drop. The transition piece 9 of FIG. 1 does not alleviate this problem either. According to the principle of the invention, it is the passage 63 (FIG. 3) of the support plate 64 which acts as the inlet opening of the Venturi nozzle, and the pressure drop is not only considerably less than in the case of FIG. 1 but also FIG. 2.

The next important obstacle for the coolant flow which has passed the core support plate 64 through the passage 63, is the lower tie plate 53, which has flow through holes for guiding the coolant into the spaces between adjacent fuel rods. As a first step to reduce the flow resistance, the through holes could be enlarged. In the prior art there are fuel rods which are screwed to the lower tie plate in the same way as it is shown together with the part-length fuel rods of FIG. 1. Even fuel rods not screwed into the tie plate have end caps with guiding tips that extend into openings of the lower tie plate in order to fix the lower ends of the fuel rods horizontally. In the prior art, the flow through holes in the lower tie plate can not be substantially enlarged. In the preferred embodiment however, the end cap of the fuel rods (except partial-length fuel rods) are not screwed into the lower tie plate.

Figure 7:
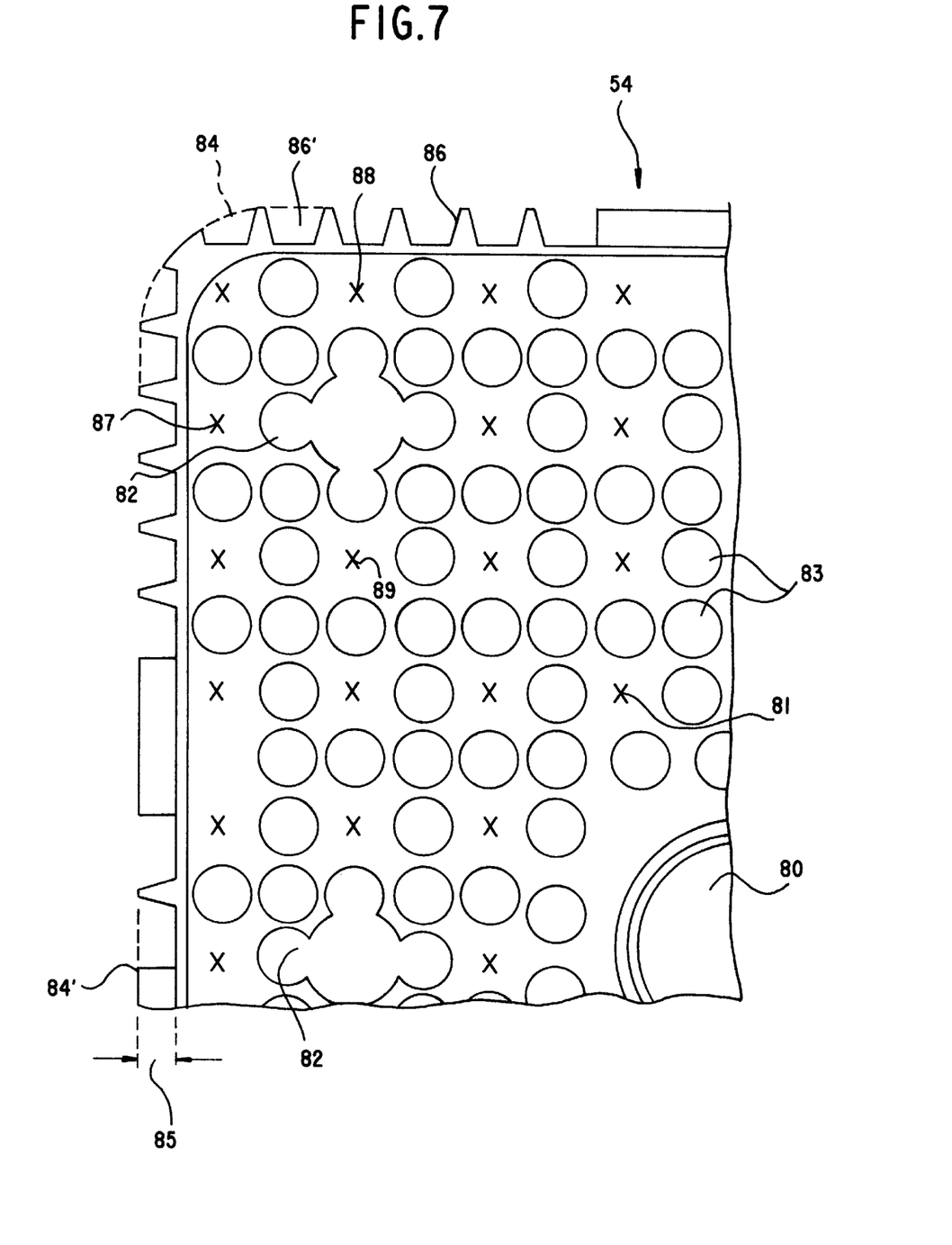
FIG. 7 is a fragmentary, plan view of a section of the lower tie plate.
Figure 8:
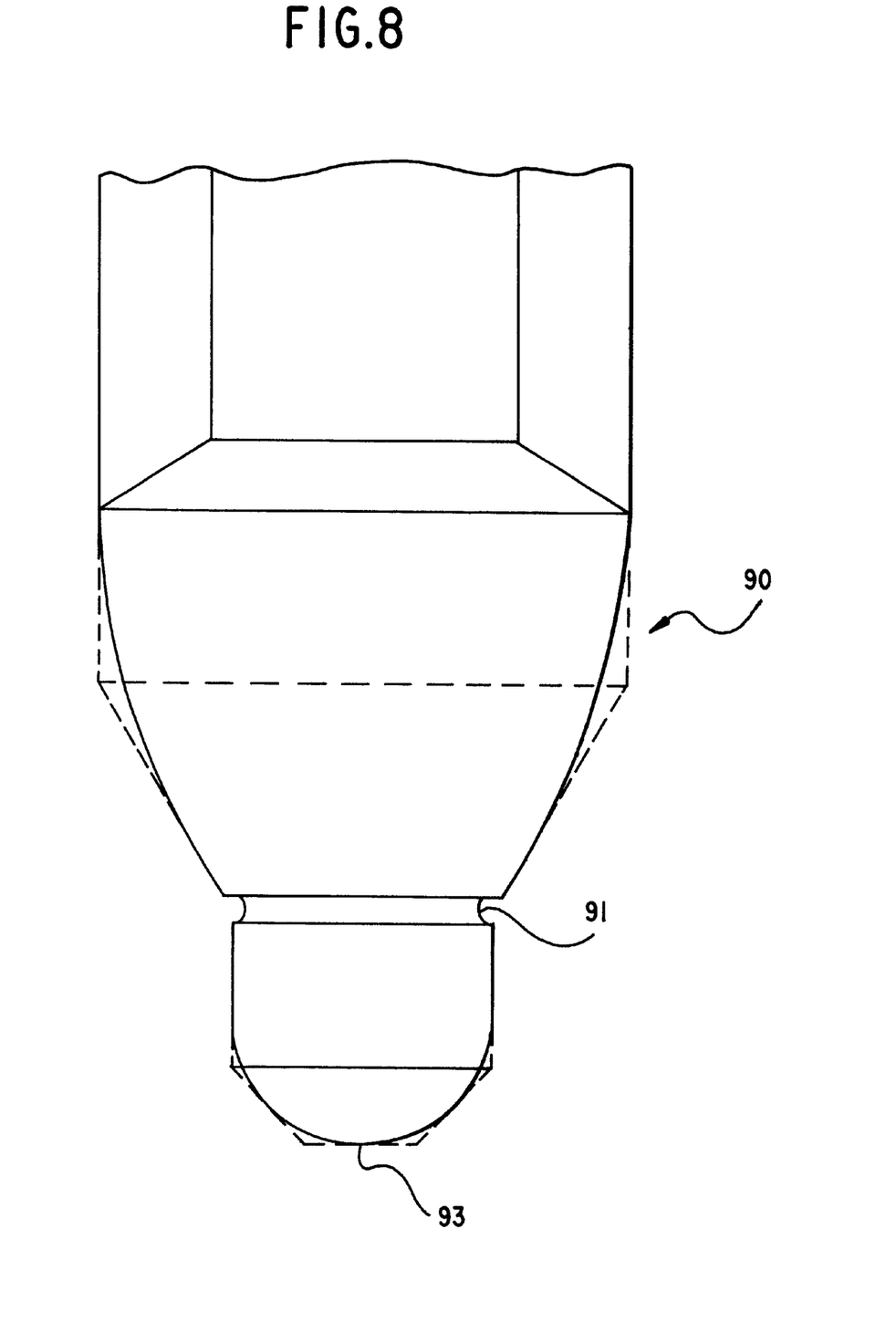
FIG. 8 is a side-elevational view of a stream-lined end cap of a fuel rod.

FIG. 7 shows a section of a lower tie plate 54 for a fuel assembly having fuel rods disposed in 11 rows and 11 columns (only five rows and six columns of rod positions are shown). In the center of the lower tie plate 54 a large flow hole 80 replaces 3×3 fuel rods and acts as a device to screw the above mentioned central water channel (position 21 in FIG. 1) to the lower tie plate. The positions where fuel rods of full length stand on the lower tie plate 54 are marked by crosses 81 and recesses where part length fuel rods are screwed into the lower tie plate 54 are shown at 82. The fuel rod positions are surrounded by at least eight through holes 83.

The dashed line 84 in FIG. 7 shows an inner surface of a water channel or the upper rim of the transition piece, and determines the maximum width of the lower tie plate.

The lower tie plate 54 has a smaller cross section than the fuel channel itself and is spaced apart from the walls of the fuel channel and the periphery of the transition piece (line 84). Therefore, a gap occurs. The gap is maintained by ribs 86 which laterally protrude from the lower tie plate 54 towards the channel walls and constitute peripheral through holes 86'. The ribs 86 are relatively small: their base line on the lower tie plate 54 may be less than (e.g. about half of) the distance between adjacent ribs 86. Therefore, the cross area of the ribs 86 is much smaller than the cross section of the through holes 86'. Therefore, a considerable part of the coolant is directed to the area next to the channel walls. This is advantageous since a sufficient coolant flow is often difficult to maintain between the peripheral fuel rods and the channel wall of a fuel assembly.

Specific attention is drawn to the fuel rod positions 87, 88, 89. It is obvious that the through holes surrounding these positions must be much smaller and/or reduced in number if the full length-fuel rods at position 87 and 88 are screwed into corresponding recesses in the same way as the part length-fuel rod at position 89. Additionally, there is no space for a peripheral hole. Therefore, the through holes in FIG. 7 are relatively large.

On the other hand, by using eight through holes next to the inner fuel rods, their individual cross section is still relatively small and retains most of the above mentioned debris which could damage the fuel rods.

The end caps 90 (FIG. 8) of the fuel rods themselves have a peripheral notch 91 or a similar profile which is used to grasp the fuel rods by a handling tool and pull them through the meshes of the spacer grids during manufacturing of the assemblies. In the prior art, as shown by dashed lines in FIG. 8, the cross section of the end caps is reduced step by step and finally forms a truncated cone with a blank front 93. Therefore, well known end caps have several edges. According to the invention, a remarkable advantage is gained by a streamlined or at least half spherical-shaped tip profile. Also, all the edges above the profile are rounded. Therefore, the end caps of the fuel rods create a less turbulent coolant flow, resulting in a reduced flow resistance and pressure drop for the coolant when it has passed the lower tie plate.

Thus, the preferred embodiment contains several improvements (centering fingers instead of an annular centering device, enlarged through holes in the lower tie plate, peripheral through holes between the tie plate and the channel wall, streamlined fuel rod-end caps), but the invention is not limited to the combination of all these features. The basic idea of these features is not limited to the specific embodiment shown in the figures and can be altered within the teaching of this invention.

We claim:

1. In combination with a core of a boiling water nuclear reactor, including a support plate and cylindrical coolant flow passages each having a cylindrical part and a conical upper rim acting as a counter surface and extending substantially perpendicularly through the support plate, a nuclear fuel assembly resting on the support plate and subjected to the coolant flow, comprising:

a) a fuel channel having open upper and lower ends and an essentially rectangular cross section;
   b) a bundle of substantially vertical fuel rods intersecting said cross section of said fuel channel, said fuel rods laterally surrounded by said fuel channel; and
   c) a transition piece inserted into said open lower end of said fuel channel and having an essentially circular inlet opening formed therein, including:
      i) an annular rim surrounding said essentially circular inlet opening at a lower end of said transition piece, said annular rim having a conically tapered sealing surface to be fitted into the corresponding conical counter-surface formed by the upper rim of one of the cylindrical passages;
      ii) a lower tie plate disposed in said lower open end of said fuel channel;
      iii) a funnel-like enlargement piece adjacent said conically tapered sealing surface and having an upper part, said upper part of said funnel-like enlargement piece matching said cross section of said fuel channel and supporting said lower tie plate covering said open lower end of said fuel channel; and
      iv) a centering and positioning device for positioning said conically tapered sealing surface in a coaxial position with respect to the conical counter surface, said centering and positioning device protruding from said annular rim down into one of the cylindrical passages, said positioning and centering device having at least three fingers equidistantly distributed along a circumference of said annular rim, said circular inlet opening having a diameter equal to a diameter of one of the cylindrical passages, and said at least three fingers extending radially into said circular inlet opening.

2. The nuclear fuel assembly according to claim 1, wherein said at least three fingers have straight finger parts adjacent said annular rim and parallel to side walls of the cylindrical passages.

3. The nuclear fuel assembly according to claim 2, wherein said straight finger parts have a peripheral surface forming segments of a surface of a cylinder with a radius, said radius of said cylinder is at most one millimeter less than a radius of the cylindrical passages.

4. The nuclear fuel assembly according to claim 1, wherein said conically tapered sealing surface has, at its smallest circular cross section, a diameter at least equal to a diameter of the cylindrical passages.

5. The nuclear fuel assembly according to claim 1, wherein the conical counter-surface and the cylindrical part of the cylindrical passages form an edge surrounding an axis of the cylindrical passages, and said annular rim of said transition piece is configured to be positioned above the edge.

6. The nuclear fuel assembly according to claim 1, including a lower most tip part, said at least three fingers having finger ends pointing to each other in a star-like manner and fixed together by said lower most tip part.

7. The nuclear fuel assembly according to claim 1, including connecting pieces having one of a concave curvature and a recessed edge with respect to a slope of said conically tapered sealing surface, said at least three fingers are connected to said annular rim by said connecting pieces.

8. The nuclear fuel assembly according to claim 1, wherein said fuel channel has four side walls, said lower tie plate has a smaller cross section than said fuel channel, and including a plurality of ribs, said lower tie plate spaced apart from said walls of said fuel channel by said plurality of ribs on each of said four side walls of said fuel channel, said plurality of ribs forming a plurality of flow-through holes between said fuel channel and said lower tie plate.

9. The nuclear fuel assembly according to claim 8, wherein said plurality of ribs have a base with a width at most equal to about half a distance between adjacent ribs.

10. The nuclear fuel assembly according to claim 1, wherein each of at least a majority of said fuel rods has an end cap at a lower end of said fuel rods, and said fuel rods are positioned above said lower tie plate.

11. The nuclear fuel assembly according to claim 10, wherein said end cap has a profile to be grasped by a handling tool, and one of a streamlined and approximately half-spherically rounded tip below said profile and a rounded edge above said profile.

* * * * *

UNITED STATES PATENT AND TRADEMARK OFFICE
CERTIFICATE OF CORRECTION

PATENT NO : 5,943,385
DATED : August 24, 1999
INVENTOR(S) : Stefan Drecker et al.

It is certified that error appears in the above-identified patent and that said Letters Patent is hereby corrected as shown below:

ON THE TITLE PAGE:

Item [75] should read as follows:

Inventors:

Stefan Drecker, Lingen; Dieter Menges, Eggolsheim; Werner Meier, Kunreuth; Dietrich Alter, Erlangen, all of Germany: David Barkhurst, Pasco, WA; Knut Emmert, Frankfurt, Germany Signed and Sealed this Twenty-eighth Day of December, 1999

Attest:

Q. TODD DICKINSON

Attesting Officer

Acting Commissioner of Patents and Trademarks